(12) United States Patent
Balasubramanian et al.

(10) Patent No.: US 8,027,248 B2
(45) Date of Patent: Sep. 27, 2011

(54) ACCESS PORT ADOPTION TO MULTIPLE WIRELESS SWITCHES

(75) Inventors: Karthikeyan Balasubramanian, Bangalore (IN); Venkatesh Kannan, Madurai (IN); Shrijith Velayudhan, Bangalore (IN); Vivek Krishnan, Bangalore (IN); Somesh Agrawal, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 120 days.

(21) Appl. No.: 12/234,145

(22) Filed: Sep. 19, 2008

(65) Prior Publication Data

US 2010/0074099 A1  Mar. 25, 2010

(51) Int. Cl.
    *H04L 12/28* (2006.01)
(52) U.S. Cl. ............................................. 370/219; 726/3
(58) Field of Classification Search .................. None
    See application file for complete search history.

(56) References Cited

U.S. PATENT DOCUMENTS

| 7,113,498 | B2 * | 9/2006 | Bajic ............................... 370/338 |
| 7,499,411 | B2 * | 3/2009 | Batta et al. .................... 370/254 |
| 7,639,656 | B2 * | 12/2009 | Dooley et al. ................ 370/338 |
| 7,873,352 | B2 * | 1/2011 | Nguyen et al. ............... 455/411 |
| 2005/0254653 | A1 * | 11/2005 | Potashnik et al. ........... 380/270 |
| 2006/0005008 | A1 * | 1/2006 | Kao ................................ 713/153 |
| 2007/0002833 | A1 * | 1/2007 | Bajic ............................... 370/352 |
| 2007/0230415 | A1 * | 10/2007 | Malik ............................. 370/338 |
| 2008/0002642 | A1 * | 1/2008 | Borkar et al. ................ 370/338 |
| 2010/0027516 | A1 * | 2/2010 | Nagarajan ..................... 370/338 |

* cited by examiner

*Primary Examiner* — Kwang B Yao
*Assistant Examiner* — Alex Skripnikov

(57) ABSTRACT

An apparatus, network and techniques for minimizing wireless network downtime associated with a wireless switch failure are disclosed. Access ports are adopted to multiple wireless switches wherein one switch operates to exchange data and control traffic with the access port and remaining switches operate to exchange control traffic with the access port. In the event of a link failure between the wireless switch exchanging data and control traffic with the access port, the access port remains adopted to remaining switches and exchanges data and control traffic with one of the remaining switches.

9 Claims, 6 Drawing Sheets

ACCESS PORT ADOPTION TO MULTIPLE WIRELESS SWITCHES

TECHNICAL FIELD

This disclosure relates to a redundancy architecture for a wireless network and, more particularly to avoiding wireless network downtime during redundancy failover.

BACKGROUND

Generally, redundancy provisions included in wireless networks attempt to minimize downtime associated with a failover in network components. In the context of a network switch failure, access ports associated with a failed switch typically un-adopt the failed switch and adopt a redundant switch. This adoption process can take anywhere from twenty (20) seconds to upward of ninety (90) seconds based on the number of access ports.

During the failover time period, wireless mobile units associated with the access ports typically have to loose network connectivity as the access ports will go offline from the wireless switch. In addition, during the failover process, there is no way to exchange the data traffic, until the access port is newly adopted to another redundant switch.

Accordingly, there is a need for an improved technique to minimize network downtime connectivity during failovers. In addition, there is a need to efficiently manage and continue the wireless data traffic upon a network switch failure.

SUMMARY

An apparatus, network and techniques for minimizing wireless network downtime associated with a wireless switch failure are disclosed. Access ports are adopted to multiple wireless switches wherein one switch operates to exchange control and data traffic with the access port and remaining switches operate to exchange control traffic with the access port. In the event of a link failure between the switch exchanging control and data traffic with the access port, the access port remains adopted to remaining switches and exchanges data and control traffic with one of the remaining switches.

For example, according to one aspect, a method of minimizing wireless network downtime associated with a wireless switch failure includes adopting an access port to a N number of wireless switches. The access port is actually adopted by a first switch of the N number of wireless switches, wherein the first switch is configured to send control and data traffic to the access port, and virtually adopted by N−1 wireless switches, wherein the N−1 wireless switches are configured to send control traffic to the access port, N being an integer value greater than 1. The method also includes selecting a second switch from the N−1 switches to actually adopt the access port. The second switch is configured to send control and data traffic to the access port upon a link failure between the access port and the first wireless switch.

In one embodiment, the method includes receiving the control and data traffic at the access port from the second wireless switch upon the link failure based on the selection. The method can also include forwarding data traffic to the second switch upon the link failure.

In another embodiment, the method includes sending a message to the N wireless switches from the access port, the message comprising a status, MAC address and hardware version of the access port, sending a reply message from each of the N wireless switches to the access port, the reply message comprising a number of access ports presently adopted by each of the N wireless switches, and selecting at least one of the first and second switches from the N wireless switches based on a least number of access ports presently adopted by each of the N wireless switches.

The method can also include downloading firmware from the first switch to the access port, the firmware including configuration instructions to adopt the access port. In one embodiment, the method includes sending an initialization message to all of the N wireless switches from the access port, and storing a MAC address associated with each of the N wireless switches in response to receiving a response message from the N wireless switches.

In yet another embodiment, the method includes updating a status of a mobile device associated with the access port using a message exchange between all of the N wireless switches, and sharing a Pair-wise Master Key (PMK) among the N wireless switches using a private message between the N switches when said mobile device is configured with Wi-Fi Protected Access (WPA) or WPA Version 2 encryption. The method can also include protecting the PMK using IPSec Virtual Private Network (VPN) tunnel between the N wireless switches.

The method can also include updating a status of mobile devices associated with the access port using a message exchange between all of the N wireless switches, and sending de-authentication packets to the mobile devices identified in a memory of said second switch.

In another aspect, a method to reduce wireless switch network downtime with use of Virtual Router Redundancy Protocol (VRRP) includes adopting an access port to a master wireless switch and a backup wireless switch. The master wireless switch is configured to send control and data traffic to the access port and to receive data traffic from the access port. The backup wireless switch is configured to monitor availability and state of said master wireless switch. The method also includes sending data traffic to the backup wireless switch upon a link failure between the access port and the master wireless switch.

In one embodiment, the method includes exchanging messages between the master and the backup wireless switches to update a status of the access port and information concerning access ports adopted by the master wireless switch, the messages utilizing a wireless switch protocol.

The method can include sending a first message from the access port to the master and backup wireless switches, the message utilizing the wireless switch protocol, and replying to the first message with a second message, the second message identifying a MAC and IP address of both said master and backup wireless switches.

In yet another aspect, a network configured to minimize wireless network downtime associated with a wireless switch failure includes an N number of wireless switches including a first wireless switch, where N is an integer value greater than 1, and an access port adopted to the N number of wireless switches. The access port is configured to receive control and data traffic from the first wireless switch and to receive control traffic from N−1 wireless switches, the N−1 wireless switches not including the first wireless switch. The access port is configured such that upon a link failure to the first wireless switch from the access port, the access port selects a second switch from among the N−1 switches to receive the control and data traffic and provides mobile device data traffic to the second switch.

In yet another aspect, an apparatus to reduce wireless switch network downtime in a Virtual Router Redundancy Protocol (VRRP) network environment includes an access port adopted to a master wireless switch and a backup wireless switch. The master wireless switch is configured to send control and data traffic to the access port and to receive data traffic from the access port. The backup wireless switch is configured to monitor availability and state of the master wireless switch. The access port is configured to send data traffic to the backup wireless switch upon a link failure between the access port and the master wireless switch.

Additional features and advantages will be readily apparent from the following detailed description, the accompanying drawings and claims.

BRIEF DESCRIPTION OF THE DRAWINGS

Like reference symbols in the various drawings indicate like elements.

DETAILED DESCRIPTION

Figure 1:
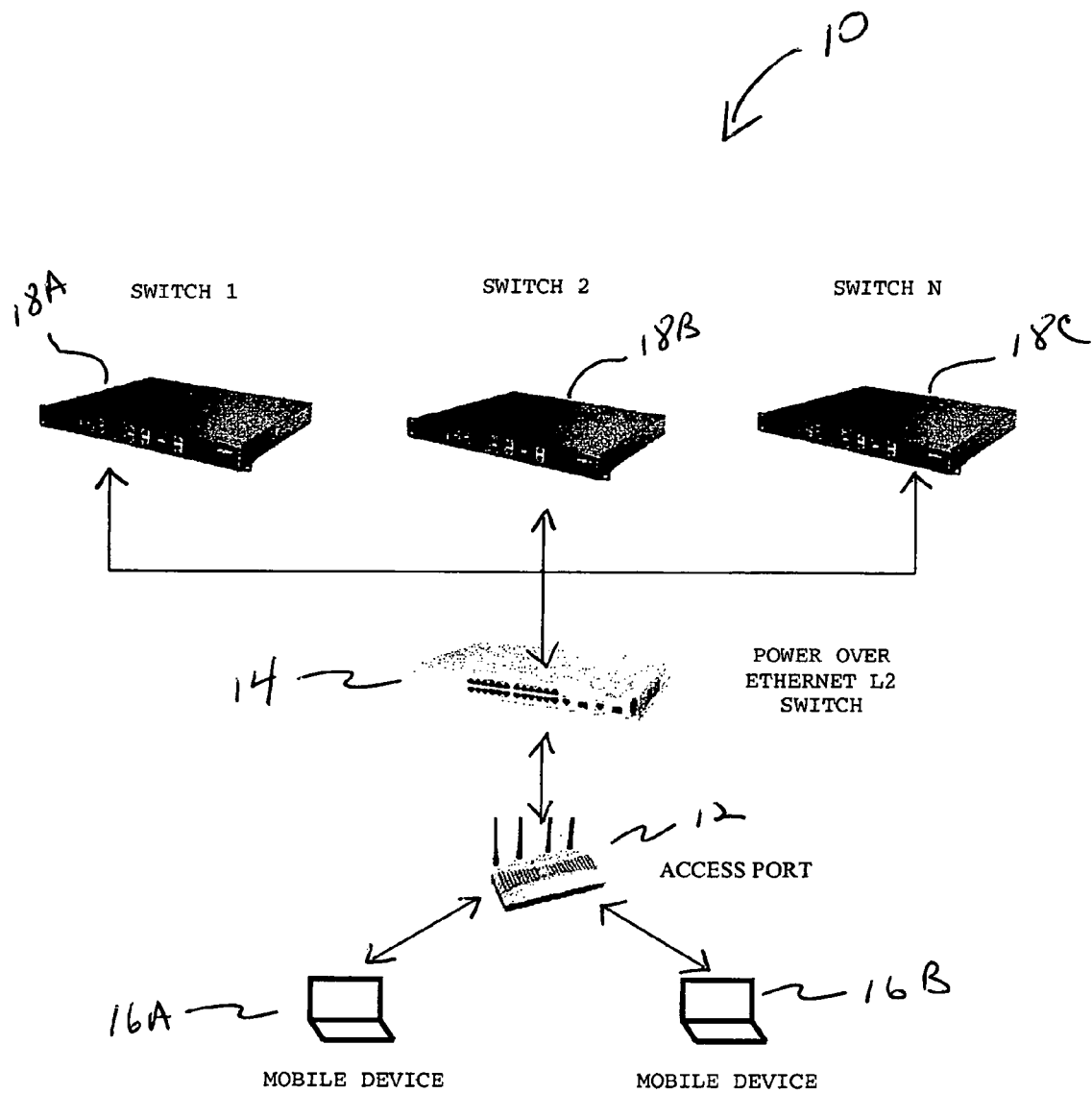
FIG. 1 illustrates example components of a first wireless network according to a first embodiment of the present invention.

Referring to FIG. 1, an example of a first logical wireless local area network 10 configured to reduce network downtime during a failover is disclosed.

As used herein, the phrase "Access Port" refers to a device with an Ethernet connection that contains at least one Portal.

As used herein, the term "Portal" is any device that is contained in an Access Port that provides a communication channel to some other device or network. A portal may be an IEEE 802.11 radio, a radio that uses some other technology than those described in IEEE 802.11 specifications, or a non-radio device such as a serial channel, fiber-optic link, etc. An access port may contain multiple portals for communicating using different protocols, such as different versions of IEEE 802.11.

As used herein, the phrase "Wireless Switch" is a device that controls one or more Access Ports and connects data between these devices to a different network, typically a wired Ethernet network.

As used herein, the term "Adoption" refers to a process by which an access port becomes associated with a wireless switch.

As shown in FIG. 1, in one embodiment, the network 10 is configured to include a plurality of wireless switches 18A-C that are configured to communicate over an Ethernet switch 14 to an access port 12. In one embodiment, the Ethernet switch 14 is a Power over Ethernet L2 switch. The access port 12 is arranged to communicate with mobile devices 16A-B using a protocol such as one or more versions of IEEE Standard 802.11, or other wireless data communications protocol. In one embodiment, the mobile devices 16A-B are configured to include Wi-Fi Protected Access (WPA) or WPA Version 2 encryption. Although only one access port is shown in FIG. 1, it will be appreciated by one skilled in the art that more than access port can be utilized with the present invention.

In one embodiment, communication between the wireless switches 18A-C and the access port 12 or portal within the access port 12 uses WISP messages (WISP is an acronym for Wireless Switch Protocol). Preferably, all fields are in big endian format. Within each field the highest order bit is shown to the left and the lowest order bit is shown to the right.

As shown in FIG. 1, preferably, the access port 12 is adopted to the multiple wireless switches 18A-C resulting in no state where the access port 12 is un-adopted during a failover. For example, if a link failure occurs between any one switch and the access port, the access port 12 remains adopted to all the available switches.

Preferably, the access port 12 is actually adopted by a first switch of N number of wireless switches, where N is an integer value. By being actually adopted, the first switch is configured to send control and data traffic to the access port 12. The access port 12 is also virtually adopted by N−1 wireless switches, where N−1 wireless switches are the number of switches not configured to send control and data traffic to the access port 12. For example, in FIG. 1, the access port 12 is actually adopted by 'switch 1' 18A and virtually adopted by 'switch 2' 18B and 'switch 3' 18C. By being virtually adopted, switches 18B and 18C are configured to send control but not data traffic to the access port 12.

In one embodiment, upon a link failure to the first wireless switch, the access port 12 selects a second switch from the N−1 wireless switches to actually adopt the access port 12. Once the access port 12 is adopted by the second switch, the second switch exchanges control and data traffic with the access port 12.

Figure 3:
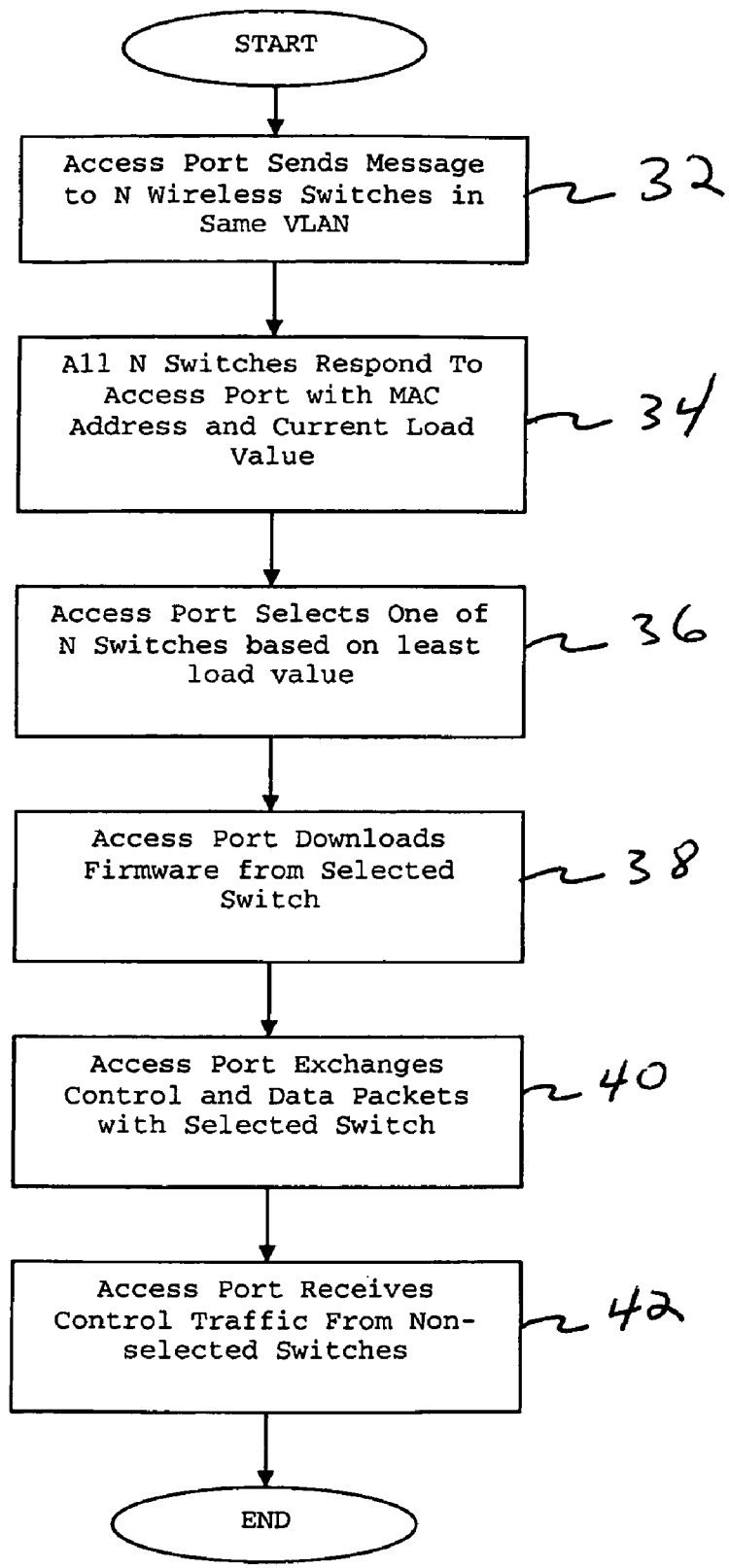
FIG. 3 is a flow chart of a method of adopting an access port to a plurality of wireless switches included in the network shown in FIG. 1.

A method of adopting an access port to a plurality of wireless switches included in the network shown in FIG. 1 is discussed in connection with FIG. 3. As shown in FIG. 3, first, the access port 12 sends a message to the N wireless switches associated with the same virtual local area network (VLAN) 32. In one embodiment, the access port 12 is configured to utilize the Wireless Switch Protocol (WISP) and sends a "Hello" packet to each of the switches 18A-C which respond with a parent message. For example, in one embodiment, all of the N switches respond back to the access port 12 with a MAC address and current load value 34. The current load value represents the number of actual access ports adopted by a particular switch.

Next, the access port 12 selects a preferred switch based on the switch responses. In one embodiment, the access port 12 selects the parent switch from the N switches based on the least load value included in the switch responses 36. The access port 12 then downloads firmware from the selected switch 38. For example, in one embodiment, the access port downloads the firmware from the selected switch using a "LoadMe" message.

Once the download is complete, the access port 12 then sends a "ConfigMe" message to the selected switch. Once complete, the access port 12 exchanges control and data packets with the selected switch 40 and receives control traffic from the non selected switches 42. For example, in one embodiment, WISP status and WISP heartbeats are exchanged between the access port 12 and the N number of switches. As a result, the access port 12 is adopted to all of the N switches. The access port 12 is virtually adopted by the non-selected switches as all data packets are intended to be directed to the selected switch.

Figure 4:
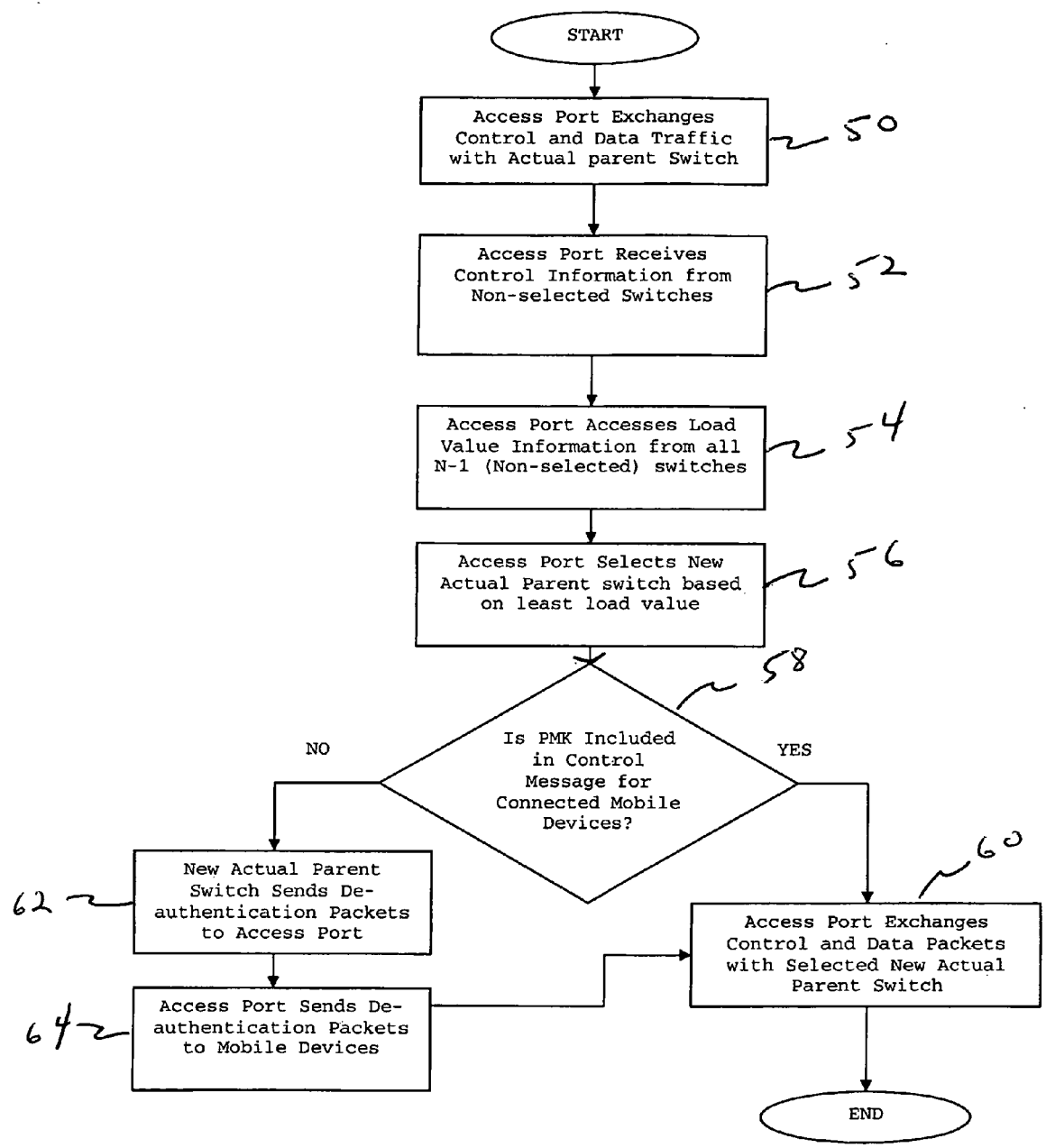
FIG. 4 is a flow chart of a method executed during a failover of the network shown in FIG. 1.

Referring now to FIG. 4, an example method executed upon a link failure in the network shown in FIG. 1 is disclosed. As indicated in FIG. 4, prior to network failure, the access port 12 exchanges control and data traffic with the selected switch 50, hereinafter referred to as an actual parent switch, and receives control information from non-selected switches 52. Upon a link failure between the actual parent switch and the access port 12, the access port 12 accesses load value information from all N−1 (non-selected) switches 54. Once load value information is accessed, the access port 12 selects a new actual parent switch based on the least load value 56. In one embodiment, if the control message includes a wireless protocol security mechanism, such as a pair-wise master key (PMK) 58, the access port exchanges control and data packets with the selected new actual parent switch 60. Otherwise, the selected new actual parent switch sends de-authentication packets to the access port 62 which in turn sends the de-authentication packets to the mobile devices 64. Once the de-authentication packets are sent to the mobile devices, the access port exchanges control and data packets with the selected new actual parent switch 60.

In the event a second access port is to be connected to the L2 switch 14 in the same VLAN, the second access port selects the switch to exchange control and data traffic with based on the least number of actual access ports connected to a particular switch. Upon a link failure to the particular switch, the second access port selects a new actual parent switch based on the least load value.

Figure 2:
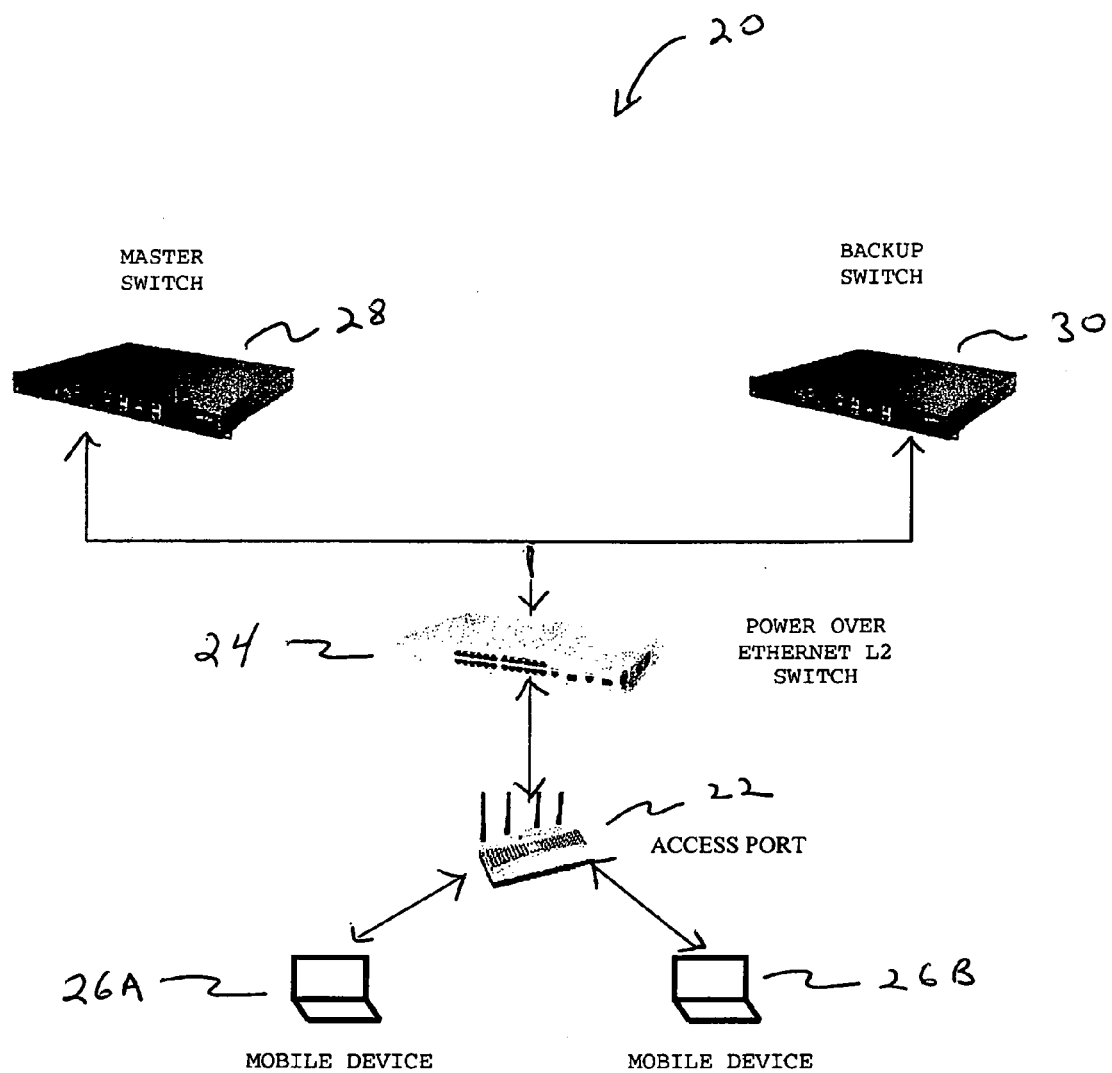
FIG. 2 illustrates example components of a second wireless network according to a second embodiment of the present invention.

Referring now to FIG. 2, an example of a second wireless network 20 configured to reduce network downtime during a failover is disclosed. As shown in the FIG. 2 example, in one embodiment, the network 20 is configured to use an Internet protocol among switches, such as the Virtual Router Redundancy Protocol (VRRP). At least one switch is configured as a master switch 28 to forward control and data traffic to an access port 22 via an L2 switch, and one switch is configured as a backup switch 30 which is configured to monitor availability and state of the master switch 28. The backup switch 30 stands ready to take over from the master switch 28 in the event of a link failure with the access port 22. As shown in FIG. 2, similar to FIG. 1, the access port 22 provides a communication channel to one or more mobile devices 26A-B.

Figure 5:
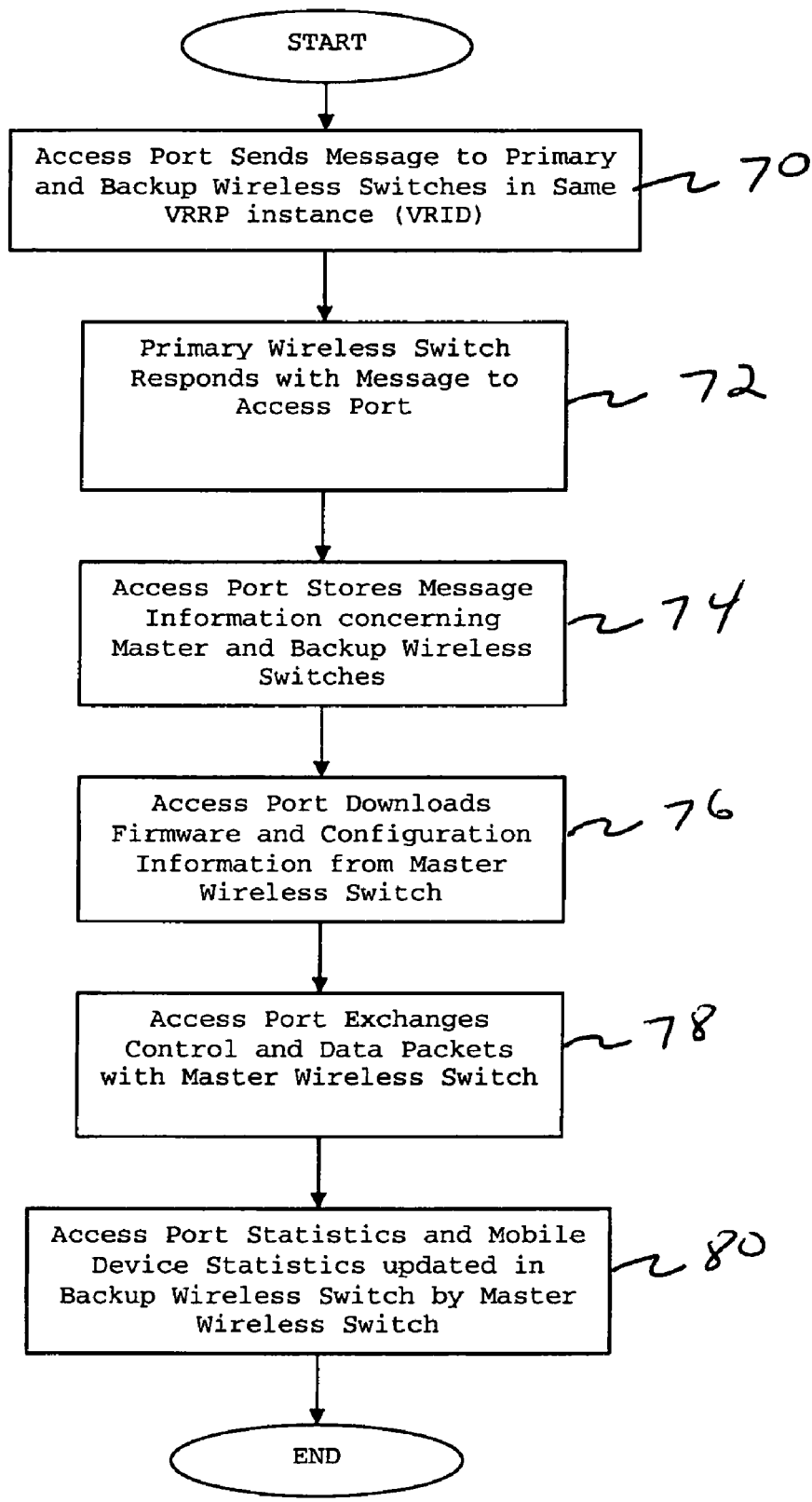
FIG. 5 is a flow chart of a method of adopting an access port to master and backup switches shown in FIG. 2.

Turning now to FIG. 5, a method of adopting the access port 22 to the master 28 and backup 30 switches shown in FIG. 2 is disclosed. First, the access port 22 sends a message to the master (primary) and backup wireless switches 70. In one embodiment, the access port 22 is configured to utilize WISP and sends a "Hello" packet to the switches 28 and 30. Preferably, the backup switch 30 does not respond to the access port as it is in standby mode for that VRRP instance (Virtual Router Identifier (VRID)). The primary wireless switch 28 responds with a message to the access port 72. The access port 22 stores the message information concerning the master and backup wireless switches 74 in memory and then downloads firmware and configuration information from the master wireless switch 76. For example, in one embodiment, the configuration information includes details, such as a Media Access Control (MAC) address and Internet Protocol address for both the master and backup switches 28, 30. The access port 22 then exchanges control and data packets with the master wireless switch 78. Access port statistics and mobile device statistics are then updated in the backup wireless switch by the master wireless switch 80. In this way, the access port 22 is actually adopted by the master wireless switch 28 and virtually adopted by the backup wireless switch 30.

Of course, it will be appreciated by one skilled in the art that the wireless switches 28, 30 included in the network shown in FIG. 2 can each operate as master and backup switches to multiple access ports depending on the number of VLANs included in each. For example, in one embodiment, VRRP is implemented on both the wireless switches and a VRID is used to identify participating switches within the VRRP configuration. VRID 1 (associated with a first virtual lan 1) is associated with a first switch configured as a master switch and a second switch configured as a backup/standby switch. VRID 2 (associated with a second VLAN) has the second switch configured as the master switch and the first switch configured as the backup/standby switch. Using this technique, access ports connected to the first VLAN (VRID 1) are actually adopted to the first switch (as it is primary for VRID 1) and virtually adopted to the second switch. Similarly, access ports connected to the second VLAN (VRID 2) are actually adopted by the second switch (as it is primary for VRID2) and virtually adopted to the first switch. In one embodiment, Wireless Network Management Protocol (WNMP) messages are exchanged between the first and second switches for VRID 1 and VRID 2. The WNMP messages contain the details concerning the actual adopted access ports and the virtual adopted access ports adopted by a particular switch and the status of the actual access ports adopted (e.g., adopted, un-available, dis-adopted).

Figure 6:
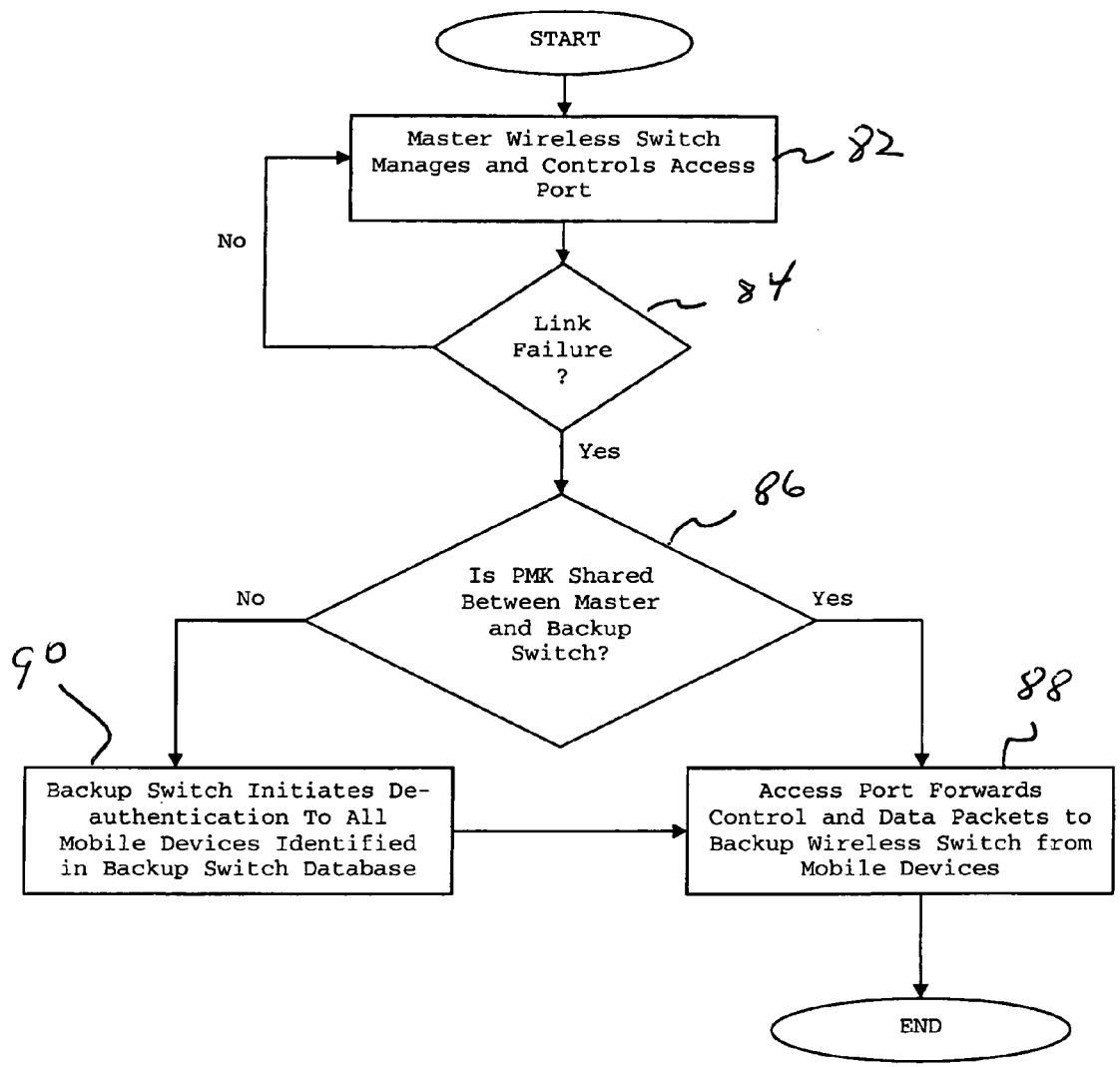
FIG. 6 is a flow chart of a method executed during a failover of the network shown in FIG. 5.

Turning now to FIG. 6, a method executed during a failover of the network shown in FIG. 2 is disclosed. As shown in FIG. 6, prior to link failure, a master wireless switch manages and controls the access port 82. If a link failure occurs between the access port and the master wireless switch 84, a determination is made whether a PMK is shared between the master switch and the backup wireless switch 86. For example, in one embodiment, VPN tunneling is used to share PMK keys among switches. If a PMK is shared between the master and backup switch, the access port 22 forwards control and data packets to the backup wireless switch 30 from the mobile devices 88. Otherwise, the backup switch 30 initiates de-authentication to all mobile devices 26A-B identified in the backup switch database 90 and the access port 22 forwards the control and data packets to the backup wireless switch 88. Advantageously, mobile unit re-authentication time to the same access port takes approximately a few milliseconds, which can be negligible when compared to existing failure downtimes.

Regardless of failover method employed, upon an access port being adopted actually to one switch and virtually adopted to another switch, a status of mobile units associated with the adopted access port is updated in both the switches. For example, in one embodiment, the switch which has actual access ports adopted sends the status of mobile units to other switches that have virtually adopted the access port using WNMP messages.

Mobile unit data packets flow via the switch where the access port is actually adopted in both the methods described above.

It will be appreciated that various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A method of minimizing wireless network downtime associated with a wireless switch failure comprising:

adopting an access port to a N number of wireless switches, wherein said access port is actually adopted by a first switch of said N number of wireless switches, said first switch configured to send control and data traffic to said access port, wherein said access port is virtually adopted by N−1 wireless switches, said N−1 wireless switches configured to send control traffic to said access port, N being an integer value greater than 1;

selecting a second switch from said N−1 switches to actually adopt said access port upon a link failure between said access port and said first wireless switch, whereupon if the first and second switches share a wireless protocol security mechanism, said second switch configured to send control and data traffic to said access port, and otherwise the second switch sending de-authentication packets to mobile devices identified in a memory of said second switch;

exchanging control and data traffic between access port and said second wireless switch; and updating a status of said mobile devices associated with said access port using a message exchange between all of said N wireless switches.

2. The method of claim 1, wherein adopting and virtual adopting includes exchanging Wireless Switch Protocol heartbeats between the access port and the N number of switches.

3. The method of claim 1, wherein after the mobile devices are de-authenticated, further comprising re-authenticating the mobile devices to the access port.

4. The method of claim 1, comprising:
sending a message to said N wireless switches from said access port, said message comprising a status, MAC address and hardware version of said access port;
sending a reply message from each of said N wireless switches to said access port, said reply message comprising a number of access ports presently adopted by each of said N wireless switches; and
selecting at least one of said first and second switches from said N wireless switches based on a least number of access ports presently adopted by each of said N wireless switches.

5. The method of claim 4, comprising configuring said N wireless switches on a same virtual local area network (VLAN).

6. The method of claim 4, comprising downloading firmware from said first switch to said access port, said firmware including configuration instructions to adopt said access port.

7. The method of claim 1, comprising:
sending an initialization message to all of said N wireless switches from said access port; and
storing a MAC address associated with each of said N wireless switches in response to receiving a response message from said N wireless switches.

8. A network configured to minimize wireless network downtime associated with a wireless switch failure comprising:
an N number of wireless switches including a first and a second wireless switch where N is an integer value greater than 1; and
an access port, wherein;
the first wireless switch operable to actually adopt the access port, and N-1 wireless switches operable to virtually adopt the access port and send control traffic to said access port, said first switch configured to send control and data traffic to said access port, and
upon a link failure between said access port and said first wireless switch, if the first and second switches share a wireless protocol security mechanism, said second switch of said N−1 wireless switches configured to send control and data traffic to said access port, and otherwise the second switch sends de-authentication packets to mobile devices identified in a memory of said second switch, whereafter
said access port and said second wireless switch exchanging control and data traffic therebetween, and
said N wireless switches operable to update a status of mobile devices associated with said access port using a message exchange between all of said N wireless switches.

9. The network of claim 8, wherein said access port sends an initialization message to all of said N wireless switches from said access port, and stores a MAC address associated with each of said N wireless switches in response to receiving a response message from said N wireless switches.

* * * * *